United States Patent [19]

Azulay

[11] Patent Number: 5,064,708
[45] Date of Patent: Nov. 12, 1991

[54] GLASS FOR AUTOMOBILES

[76] Inventor: Alvaro B. Azulay, Calle El Parque EDF Gunta Apto A-11 Urlr. Las Mesetas, Caracas 1061, Venezuela

[21] Appl. No.: 340,463

[22] Filed: Apr. 19, 1989

[51] Int. Cl.$^5$ .................................... B32B 17/10
[52] U.S. Cl. ................................... 428/156; 40/546; 40/591; 40/593; 296/84.1; 428/410; 428/426; 428/439; 428/436; 428/437; 428/915
[58] Field of Search ............... 296/84.1; 40/593, 591, 40/546; 156/663, 657, 654; 428/156, 426, 441, 435, 436, 915, 410, 437

[56] References Cited

U.S. PATENT DOCUMENTS

| | | | |
|---|---|---|---|
| 3,375,626 | 4/1968 | Grotefeld et al. | 296/84.1 |
| 3,629,044 | 12/1971 | Sanger | 296/84.1 |
| 3,707,300 | 12/1972 | Tamburro et al. | 40/593 |
| 4,316,766 | 2/1982 | Levin et al. | 428/131 |
| 4,585,514 | 4/1986 | Scallan | 156/663 |
| 4,652,337 | 3/1987 | Picone et al. | 156/663 |
| 4,921,626 | 5/1990 | Rhonenbaugh | 156/663 |

Primary Examiner—Ellis P. Robinson
Assistant Examiner—Archene A. Turner
Attorney, Agent, or Firm—Eric P. Schellin

[57] ABSTRACT

There is disclosed automobile glass which is engraved with identifying indicia of a size whereby it can be easily viewed. Particularly, the automobile glass is of the conventional laminated type and the depth of the engraving is of sufficient depth whereby the indicia cannot be removed or obliterated. In one embodiment the engraving of the indicia is of a sufficient depth to expose a portion of the polymeric sandwiched material.

8 Claims, 1 Drawing Sheet

GLASS FOR AUTOMOBILES

BACKGROUND OF THE INVENTION

Today, due to the speed of transportation, comfort, and the continually increasing advantages achieved in respect of the motorization of human creative force, the use of the automobile is widely diffused. All this has brought about a major expansion of the automobile industry, as well as a larger demand for automobiles, as a necessity of modern man.

Now then, unfortunately, an automobile owner is exposed at the same time to the latent danger of constant theft, taking little account of the owner's rights. Automobile theft is a daily fact and one of the essential problems faced by the police all over the world. Their work is complicated more every day because of the unimaginable intelligence, of which the vehicle thieves the truly proud, when they invent more and more tricks to cover or protect their criminal acts and thereby escape detection. All this has resulted in the modification and destruction of the means of identification of vehicles, their concomitant transfer to other countries, etc., all of which makes it extremely difficult to find and recover the vehicles.

This situation gives rise to the urgent need for improved identification of automobiles, to make that task easier, quicker, and more reliable.

The purpose of identification is not only differentiation of automobiles, but also the protection of property rights in all circumstances, and particularly in cases of loss, theft, and larceny. All this is equally important for automobile insurance policies.

Generally speaking, a number of means of identification of cars are in use: manufacturer, model, engine and chassis serial numbers, and of course, license plates. Experience shows that these methods of identification have constantly failed to achieve their purpose.

Some of these attempts have been disclosed in prior issued patents. Note, for instance U.S. Pat. No. 4,316,766 to Levin et al, where an etchant is employed to mark the windshield of an automobile. Other patents of the same lineage are U.S. Pat. Nos. 4,585,514 to Scallon; 4,652,337 to Picone et al and 4,781,792. The latter patent also cites additional interesting art. None of the prior art disclose the in-depth for the indicia contemplated in carrying out the present invention.

SUMMARY OF THE INVENTION

This invention is aimed at two basic fields, mentioned above: the improvement of vehicle identification, and the rights of the owner. These goals can be achieved through an unerasable engraving of the vehicles license plate (letters and numbers) or other unmistakable identification in the rear windshield and/or possibly in the rear window, all such engravings in sizes corresponding to the diversity or variety of the said symbols in the different countries.

An essential aspect of the invention is the depth of the engraving, which is codetermined by the thickness of the pane. The purpose is to make it impossible and to prevent every attempt to erase or obliterate the engraving without providing telltale signs thereof. The engraving is unerasable and resistant to all measures or procedures to remove it which might be applied. Consequently, each of those attempts (for example, by grinding) would be easily visible at once, since the place of the engraving would then have at the very least a translucent appearance. Naturally, this would be clear evidence of an attempt to erase the engraving, and the vehicle would be suspect. The logical consequence would be to clarify the ownership of the vehicle in question.

It is well known that automobile glass has a laminate construction. That it is, a typical windshield has an outer glass member and an inner coextensive inner glass member with a polymeric transparent sheet therebetween. This so-called sandwich construction is designed as a safety glass whereby upon being struck to the extend that it is broken no glass shards are produced. To the contrary the glass disintegrates into small non-lethal pieces and adhere to a large extent to the polymeric inter layer. The present invention contemplates etching or engraving the desired indicia to a depth whereby the entire glass surface is removed to thereby expose the polymeric material. Thereby, no additional underlayer of glass is available for grinding away the indicia should an attempt be made to do so.

It is contemplated within the purview of the invention that the said indicia may be applied to either side of the glass.

If the attempts to remove the engraving as indicated herein, or the corresponding procedures, were to be taken to extremes, the consequence would be destruction of the glass pane, which would likewise reveal the criminal fact in the vehicle.

Therefore, the only may to remove the said characteristics or information would be to change the engraved window panes. This would be very inconvenient for the thief and would help to clarify vehicle thefts.

DETAILED DESCRIPTION OF THE INVENTION

The engraving could be made as follows:
1) At a distinguishing part or sector 3 of the upper right corner of the windshield, in such a way as not to diminish the driver's field of vision at all.
2) At a distinguishing part or sector 6 of the upper left corner of the rear window, in such a way as not to diminish the driver's angle of vision through the rear view mirror.

The ideal size of the sections 3,6 containing the engraved information would be such as to make it possible to read the same from a distance of 10 meters. With that, both the authorities and any other person could easily compare and determine the engraving as against the license plate, and know whether they coincide or not.

A similar engraving, but somewhat smaller, could be made at the lower end of the side windows and thereby, reinforce the effect of the invention.

Each common method of engraving, as described herein in the following three possibilities, could be used to make the engraving:
1. The mechanical method, using sharp steel or diamond-tipped tools, driven manually or electrically.
2. The pneumatic method, based on the use of air-driven tools, air compressors, and sand or other grinding materials.
3. The chemical method, using hydrofluoric acid as a means of cauterizing or engraving in the glass.

This invention for identification of automobiles is very advantageous, since it is fully visible, practically unerasable, and easily applicable. This demonstrates its superiority over both systems, that is, the system of identification through license plates (which can be modified at any time and changed) and the system of serial numbers on the engine or the chassis (difficult to read and recognize).

BRIEF DESCRIPTION OF THE DRAWINGS

The invention is explained below on the basis of an example of execution as demonstrated in the attached drawing.

It shows us.

DESCRIPTION OF A PREFERRED EMBODIMENT OF THE INVENTION

Figure 1:
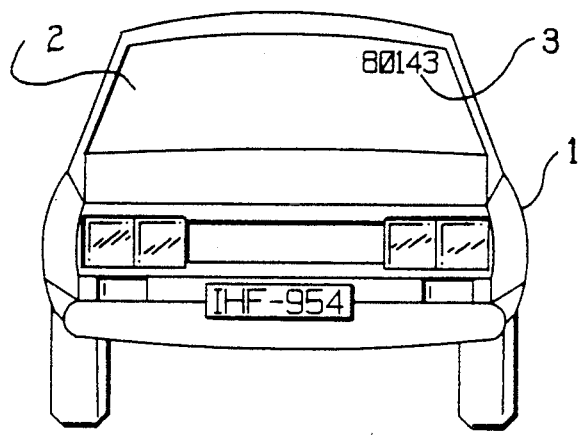
FIG 1: a front view of the automobile.
Figure 2:
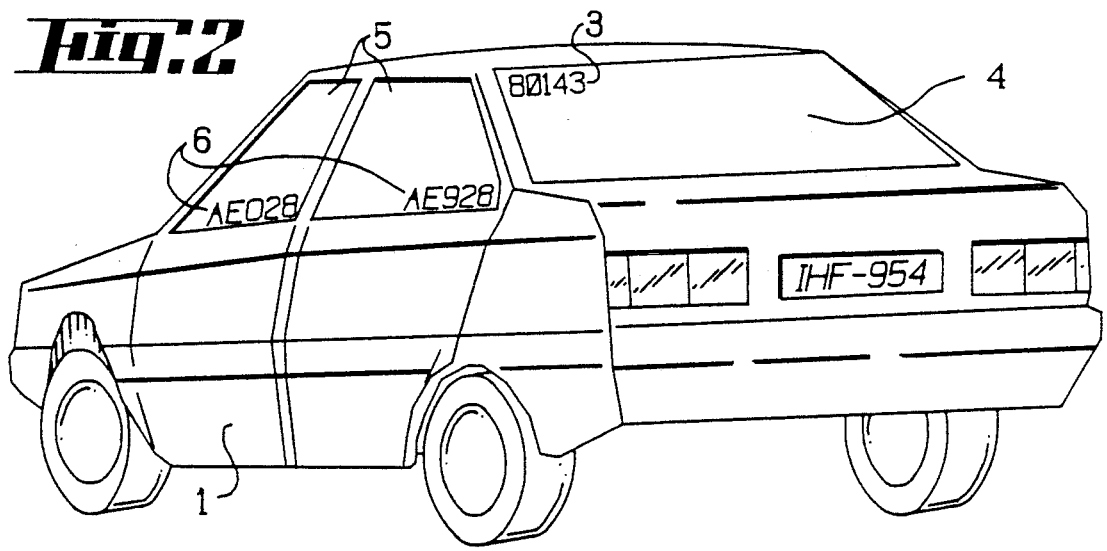
FIG. 2: a diagonal view of the automobile.

Referring now to the drawings there is shown an automobile 1 having a piece of glass window 2 having distinguishing parts or sectors 3,6 for various engravings or etchings as indicia located at corners of the glass window and being sized in such a way as not to diminish a driver's field of vision, yet including indicia of sectors 3,6 in at least one of the sectors capable of being read from a distance of about 10 meters. The indicia in the glass window extending to a depth forming and defining the sectors as sunken, unerasible and unremovable therein whereby no glass is available for removing away the indicia without providing visibility of telltale signs thereof should an attempt be made to do so.

The glass may be a laminated glass window or front windshield 2 formed of an outer glass lamina, an inner glass lamina, and a polymeric transparent polymeric web material extending coextensively therebetween. An etched or engraved indicia of the sector 3 is disposed in one of the glass lamina extending to a depth whereby a surface of the transparent polymeric web material is exposed for forming and defining sunken and unremovable sectors therein, and no additional underlayer of glass is available for removing away the indicia should an attempt be made to do so.

The sectors in the glass define an area having width and height in the glass are preferably no more than 3 centimeters in height and no more than 7 centimeters in width, and preferably no more than 25 centimeters in a total of the width of the area.

The sectors or indicia 3 located in the glass at an upper right corner of a windshield 2 of the automobile and/or an upper left corner of a rear window 4 of the automobile, are placed in such a way as not to interfere with a driver's visibility.

Side windows 5 have engraved sectors 6 sectors for indicia located in a door of the automobile are positioned preferably 3 or 4 centimeters above a sill of the door, preferably 3 centimeters in height and 3 or 4 centimeters in width.

What is claimed is:

1. Glass in an automobile comprising
   a laminated glass window having an outer glass lamina, an inner glass lamina, and a polymeric transparent polymeric web material extending coextensively therebetween,
   the glass window having distinguishing parts or sectors 3,6 located at corners of the glass window and being sized in such a way as not to diminish a driver's field of vision, yet including indicia in at least one of the sectors capable of being read from a distance of about 10 meters, and
   indicia in one of the glass lamina extending to a depth whereby a surface of the transparent polymeric web material is exposed, forming and defining the sectors as sunken and unremovable sectors therein whereby no underlayer of glass is available for removing away the indicia without providing visibility of telltale sign thereof should an attempt be made to do so.

2. Glass according to claim 1 wherein the sectors define an area having width and height in the glass are no more than 3 centimeters in its height and no more than 7 centimeters in its width for each indicia, and no more than 25 centimeters in a total of the width of the area.

3. Glass according to claim 2 wherein the width of the sectors at an upper right corner of a windshield of the automobile and/or an upper left corner of a rear window of the automobile are placed in such a way as not to interfere with a driver's visibility.

4. Glass according to claim 3 wherein the sectors in side windows located in a door of the automobile are positioned 3 or 4 centimeters above a sill of the door, 3 centimeters in its height and 3 or 4 centimeters in a total of the width of the area.

5. The laminated automobile glass window of claim 1 wherein the outer glass lamina contains the indicia.

6. The laminated automobile glass window of claim 1 wherein the inner glass lamina contains the indicia.

7. The invention of claim 1 wherein the sectors are engraved.

8. The invention of claim 1 wherein the sectors are etched.

* * * * *